United States Patent
Kohlen et al.

(10) Patent No.: US 7,237,761 B2
(45) Date of Patent: Jul. 3, 2007

(54) VALVE HAVING DOUBLE WOUND LAMELLAR RING

(75) Inventors: Peter Kohlen, Neu Anspach (DE); Michael Rennen, Bad Soden (DE)

(73) Assignee: Siemens AG, München (DE)

( * ) Notice: Subject to any disclaimer, the term of this patent is extended or adjusted under 35 U.S.C. 154(b) by 269 days.

(21) Appl. No.: 11/113,009

(22) Filed: Apr. 25, 2005

(65) Prior Publication Data

US 2007/0007481 A1    Jan. 11, 2007

Related U.S. Application Data

(63) Continuation of application No. PCT/DE03/03291, filed on Oct. 2, 2003.

(30) Foreign Application Priority Data

Nov. 1, 2002    (DE) ................................ 102 51 385

(51) Int. Cl.
*F16K 1/226* (2006.01)
(52) U.S. Cl. ........................ 251/306; 251/359
(58) Field of Classification Search ........ 251/305–308, 251/359, 365; 277/592, 633
See application file for complete search history.

(56) References Cited

U.S. PATENT DOCUMENTS

| | | |
|---|---|---|
| 1,819,890 A | 8/1931 | Gleason |
| 2,054,064 A * | 9/1936 | Anderson .................. 251/306 |
| 2,380,821 A | 7/1945 | Breeler |
| 2,840,338 A | 6/1958 | Shawn |
| 3,905,577 A * | 9/1975 | Karpenko ................... 251/306 |
| 4,003,394 A * | 1/1977 | Adams ....................... 251/306 |
| 4,290,615 A * | 9/1981 | Etcheverry ................. 251/306 |
| 4,457,490 A * | 7/1984 | Scobie ....................... 251/306 |
| 4,477,057 A * | 10/1984 | Friess ......................... 251/306 |
| 4,632,360 A * | 12/1986 | DeSalve ..................... 251/307 |
| 5,020,490 A | 6/1991 | Seko |
| 5,039,116 A * | 8/1991 | Maeda ........................ 277/444 |
| 5,326,077 A | 7/1994 | Spencer et al. |
| 6,595,488 B2 * | 7/2003 | Zwick ........................ 251/306 |
| 6,604,516 B1 | 8/2003 | Krimmer et al. |
| 6,702,257 B1 * | 3/2004 | Mollmann .................. 251/306 |

FOREIGN PATENT DOCUMENTS

| | | |
|---|---|---|
| DE | 1 721 495 | 10/1954 |
| DE | 1 297 427 A | 6/1969 |
| DE | 25 48 778 A1 | 5/1977 |
| DE | 33 42 980 A1 | 6/1985 |
| DE | 38 39 968 A1 | 5/1990 |
| DE | 199 34 113 A1 | 1/2001 |

(Continued)

OTHER PUBLICATIONS

Derwent Abstract—DE-199 34 113; Jan. 25, 2001; Robert Bosch GmbH, D-70469 Stuttgart (Germany).

(Continued)

*Primary Examiner*—John Bastianelli

(57) ABSTRACT

The present invention is directed to a valve which includes a housing having a valve seat for a flap that is rotationally mounted on a drive shaft. A double wound lamellar ring is arranged outside and around the flap in a peripheral groove of the flap. The invention also relates to the use of the valve.

3 Claims, 1 Drawing Sheet

FOREIGN PATENT DOCUMENTS

| | | |
|---|---|---|
| FR | 2 234 499 A | 1/1975 |
| GB | 732184 | 6/1955 |
| WO | WO 01/50047 A1 | 7/2001 |

OTHER PUBLICATIONS

Derwent Abstract—DE-38 39 968; May 31, 1990; Audi AG, D-8070 Ingolstadt (Germany).

Derwent Abstract—DE-33 42 980; Jun. 5, 1985; Josef Fey, D-6901 Königsbrunn (Germany).

Derwent Abstract—DE-25 48 778; May 12, 1977; Ewald Hartmann, D-5000 Köln (Germany).

Derwent Abstract—DE 1 721 495; Oct. 13, 1954; Josef Fey Jr., D-86343 Königsbrunn b. Augsbg. (Germany).

Derwent Abstract—DE 1 297 427; Jun. 12, 1969; Tröger & Entenmann Hydromaten GmbH; D-6900 Heidelberg (Germany).

Derwent Abstract—FR-223 44 99; Jan. 17, 1975; Henrion C. E., FRANCE.

* cited by examiner

VALVE HAVING DOUBLE WOUND LAMELLAR RING

CROSS REFERENCE TO RELATED APPLICATIONS

The present application is a continuation of International Application Serial Number PCT/DE03/03291, filed Oct. 2, 2003, which designated the United States and further claims priority to German patent application 10251385.6, filed Nov. 1, 2002, the both of which are herein incorporated by reference.

BACKGROUND OF THE INVENTION

The invention relates to a valve and to a use of the valve. Valves, for example for gas ducts, are known. They often comprise a housing with a valve seat in which a rotatably mounted flap is arranged for closing the gas duct. In order to avoid leakage air, the flap is provided with a piston seal encircling it on the outside. The latter generally comprises a metal ring which, for flexibility reasons, has a gap. During operation, it is often disadvantageous that leakage air can pass through this gap, which is not desirable. This is the case in particular if the gases to be conducted by the valve have relatively high temperatures and in addition greatly fluctuate in their temperatures.

SUMMARY OF THE INVENTION

The invention is therefore based on the object of providing a valve, in which the formation of leakage air can be largely avoided. Reliable closing of the gas duct is therefore to be ensured even at relatively high and fluctuating temperatures of the gas.

The object on which the invention is based is achieved by a valve which comprises a housing with a valve seat for a flap which is mounted rotatably on a drive shaft, in which a double wound lamellar ring is arranged on the outside around the flap in a peripheral groove of the flap. The double wound lamellar ring is a flat metal ring which is wound double and therefore is virtually in the shape of a simple key tag. The valve seat may also be, for example, part of the housing. It has surprisingly been shown that by means of the arrangement of the double wound lamellar ring as a piston seal, the formation of leakage air can be largely avoided. It is advantageous in this case that the flexibility of the double wound lamellar ring is provided in such a manner that the valve can be reliably closed even at higher and fluctuating temperatures of the gas. Since the arrangement of a gap is omitted, it is advantageously avoided that leakage air can pass from one side of the flap to the other side of the flap.

According to one particular refinement of the invention, the valve seat is designed as a steel ring which is pressed into the housing. As a result, the resistance to wear in the valve seat can be noticeably increased. This is particularly advantageous if the valve is to be opened and closed frequently.

According to a further refinement of the invention, a housing made from aluminum is arranged. The valve therefore has a lower weight, with, at the same time, a high resistance to wear in the valve seat being ensured.

The invention finally also relates to the use of the valve as a gas return valve of a motor vehicle. Gases which are conducted by a gas return valve of a motor vehicle generally have high temperatures and large temperature fluctuations. In this case, a formation of leakage air is entirely undesirable. The use of the valve according to the invention as a gas return valve of a motor vehicle is therefore particularly advantageous.

BRIEF DESCRIPTION OF THE SEVERAL VIEWS OF THE DRAWINGS

The invention is explained in more detail and by way of example below with reference to the drawing (FIG. 1-FIG. 2).

DETAILED DESCRIPTION OF THE INVENTION

Figure 1:
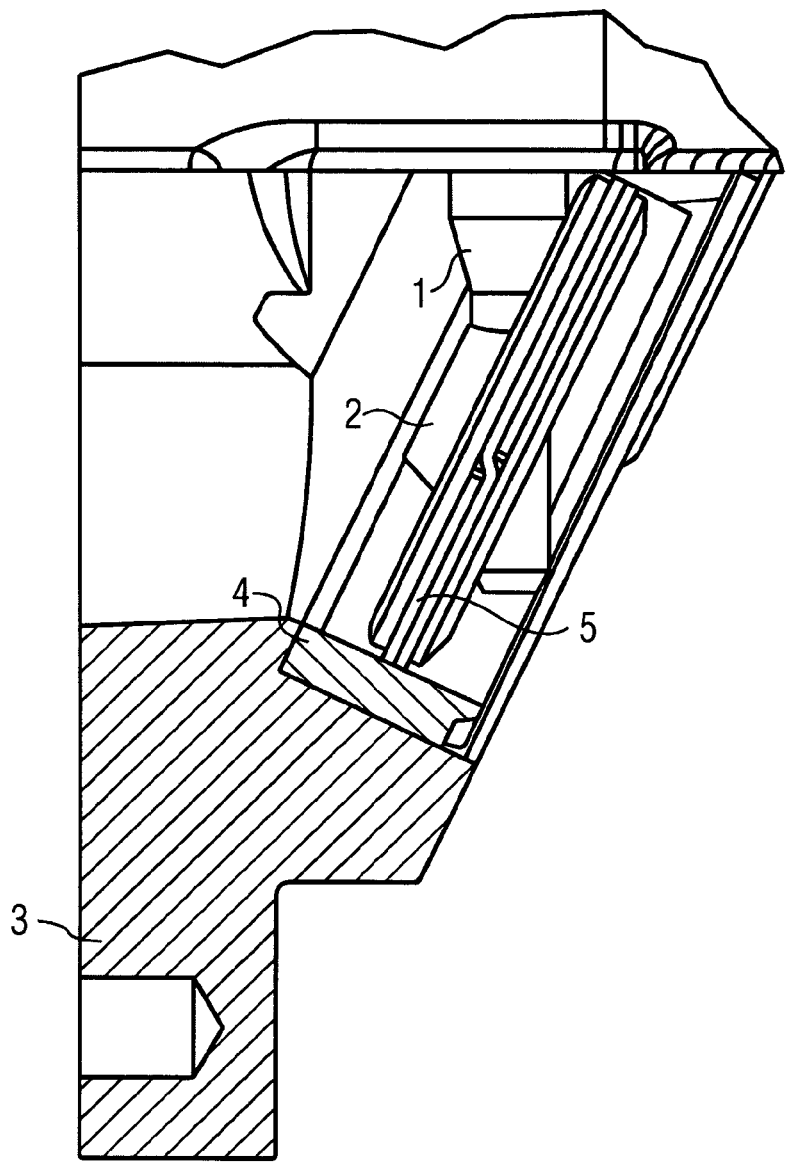
FIG. 1 shows the valve in cross section.

FIG. 1 illustrates the valve in cross section. The valve comprises a housing 3 with a valve seat 4 for a flap 2 which is mounted rotatably on a drive shaft 1. A double wound lamellar ring 5 is arranged on the outside around the flap 2 in a peripheral groove of the flap 2. The valve seat 4 is designed as a steel ring which is pressed into the housing 3. This has an advantageous effect on the resistance to wear of the valve seat 4. By contrast, the housing 3 is manufactured from aluminum, which has an advantageous effect on the weight of the valve. The valve is suitable in particular as a gas return valve of a motor vehicle.

Figure 2:
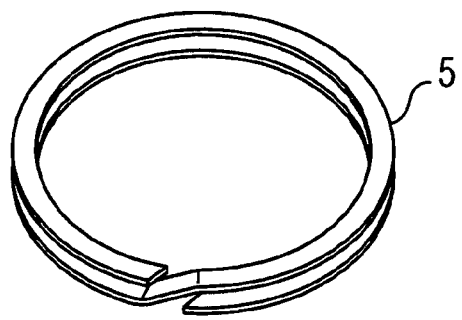
FIG. 2 shows a three-dimensional illustration of the double wound lamellar ring.

In FIG. 2, the double wound lamellar ring 5 is illustrated three-dimensionally. It is in the form of a simple key ring.

The invention claimed is:

1. A valve, comprising a housing including a valve seat for a flap which is mounted rotatably on a drive shaft, in which a double wound lamellar ring is arranged on an outside around the flap in a peripheral groove of the flap.

2. The valve according to claim 1, wherein the valve seat comprises a steel ring which is pressed into the housing.

3. The valve according to claim 2, wherein the housing comprises aluminum.

\* \* \* \* \*